United States Patent
Akieda et al.

(10) Patent No.: US 9,904,020 B2
(45) Date of Patent: Feb. 27, 2018

(54) CONNECTING COMPONENT

(71) Applicant: FUJITSU COMPONENT LIMITED, Tokyo (JP)

(72) Inventors: Shinichiro Akieda, Tokyo (JP); Osamu Daikuhara, Tokyo (JP); Hongfei Zhang, Tokyo (JP)

(73) Assignee: FUJITSU COMPONENT LIMITED, Tokyo (JP)

( * ) Notice: Subject to any disclaimer, the term of this patent is extended or adjusted under 35 U.S.C. 154(b) by 0 days.

(21) Appl. No.: 15/421,605

(22) Filed: Feb. 1, 2017

(65) Prior Publication Data
US 2017/0227718 A1     Aug. 10, 2017

(30) Foreign Application Priority Data
Feb. 5, 2016 (JP) ................................. 2016-020623

(51) Int. Cl.
*G02B 6/38* (2006.01)

(52) U.S. Cl.
CPC ......... *G02B 6/3825* (2013.01); *G02B 6/3821* (2013.01); *G02B 6/3882* (2013.01); *G02B 6/3897* (2013.01)

(58) Field of Classification Search
CPC .. G02B 6/3825; G02B 6/3821; G02B 6/3882; G02B 6/3897
See application file for complete search history.

(56) References Cited

U.S. PATENT DOCUMENTS

| | | | | |
|---|---|---|---|---|
| 5,123,071 A * | 6/1992 | Mulholland | ......... | G02B 6/3831 385/53 |
| 5,214,730 A * | 5/1993 | Nagasawa | ............ | G02B 6/3821 385/59 |
| 5,689,598 A * | 11/1997 | Dean, Jr. | ................. | G02B 6/389 385/53 |
| 5,940,561 A * | 8/1999 | Dean, Jr. | ............... | G02B 6/3825 385/59 |
| 6,135,644 A * | 10/2000 | Hakogi | ................ | G02B 6/4201 385/58 |
| 6,382,839 B1 * | 5/2002 | Eguchi | ................. | G02B 6/3821 385/56 |
| 6,669,375 B1 * | 12/2003 | Bonja | ..................... | G02B 6/266 385/140 |
| 7,004,775 B1 * | 2/2006 | Sakurai | ................ | H01R 23/661 439/260 |

(Continued)

FOREIGN PATENT DOCUMENTS

| JP | 59136709 A | * 8/1984 | .......... G02B 6/3831 |
|---|---|---|---|
| JP | 09311245 A | * 12/1997 | |

(Continued)

*Primary Examiner* — Peter Radkowski
(74) *Attorney, Agent, or Firm* — IPUSA, PLLC

(57) ABSTRACT

A connecting component configured to fix a first ferrule and a second ferrule includes a first spring, a second spring, and a partition. The first spring and the second spring are provided at opposite ends of the connecting component. The partition is provided between the first spring and the second spring to be positioned between the first ferrule and the second ferrule. The first spring is configured to press the first ferrule toward the partition. The second spring is configured to press the second ferrule toward the partition.

10 Claims, 16 Drawing Sheets

(56) References Cited

U.S. PATENT DOCUMENTS

| | | | | |
|---|---|---|---|---|
| 7,182,522 B2* | 2/2007 | Sasaki | G02B 6/389 | |
| | | | 385/53 | |
| 7,513,694 B2* | 4/2009 | Sasaki | G02B 6/3825 | |
| | | | 385/60 | |
| 7,748,994 B1* | 7/2010 | Peng | H01R 13/6315 | |
| | | | 439/660 | |
| 8,104,973 B2* | 1/2012 | Howard | G02B 6/3825 | |
| | | | 385/55 | |
| 8,678,667 B2* | 3/2014 | Koreeda | G02B 6/3882 | |
| | | | 385/59 | |
| 8,992,097 B2* | 3/2015 | Koreeda | G02B 6/381 | |
| | | | 385/78 | |
| 9,025,917 B2* | 5/2015 | Aoki | G02B 6/32 | |
| | | | 385/33 | |
| 9,201,199 B2* | 12/2015 | Lin | G02B 6/3807 | |
| 9,209,608 B2* | 12/2015 | Deshpande | H02B 1/052 | |
| 9,366,829 B2* | 6/2016 | Czosnowski | G02B 6/3885 | |
| 2003/0180004 A1* | 9/2003 | Cox | G02B 6/381 | |
| | | | 385/53 | |
| 2005/0220420 A1* | 10/2005 | Sasaki | G02B 6/389 | |
| | | | 385/55 | |
| 2006/0040539 A1* | 2/2006 | Sakurai | H01R 23/661 | |
| | | | 439/260 | |
| 2006/0051028 A1* | 3/2006 | Sasaki | G02B 6/3825 | |
| | | | 385/55 | |
| 2008/0193086 A1* | 8/2008 | Howard | G02B 6/3825 | |
| | | | 385/54 | |
| 2010/0247040 A1* | 9/2010 | Kuriki | G02B 6/3821 | |
| | | | 385/72 | |
| 2012/0321252 A1* | 12/2012 | Koreeda | G02B 6/3882 | |
| | | | 385/59 | |
| 2013/0071063 A1* | 3/2013 | Aoki | G02B 6/327 | |
| | | | 385/33 | |
| 2013/0259429 A1* | 10/2013 | Czosnowski | G02B 6/3885 | |
| | | | 385/78 | |
| 2014/0241671 A1* | 8/2014 | Koreeda | G02B 6/381 | |
| | | | 385/78 | |
| 2015/0192744 A1* | 7/2015 | Lin | G02B 6/3807 | |
| | | | 385/75 | |
| 2015/0309269 A1 | 10/2015 | Daikuhara et al. | | |
| 2017/0031106 A1* | 2/2017 | Takano | G02B 6/3871 | |

FOREIGN PATENT DOCUMENTS

| | | |
|---|---|---|
| JP | 2005-326523 | 11/2005 |
| JP | 2010038988 A * | 2/2010 |
| JP | 2010-224353 | 10/2010 |
| JP | 2011-075814 | 4/2011 |
| JP | 2015-023143 | 2/2015 |

* cited by examiner

FIG.2A
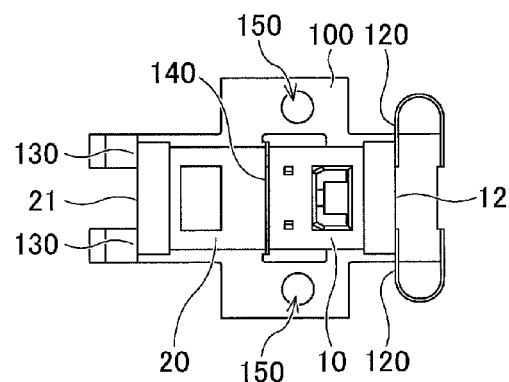
FIG.2D    FIG.2B    FIG.2E
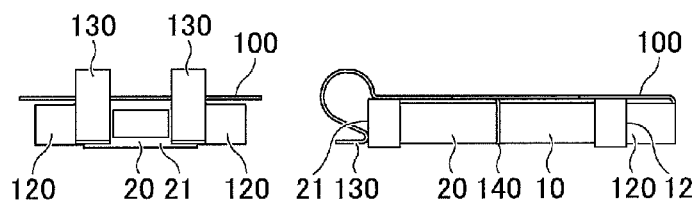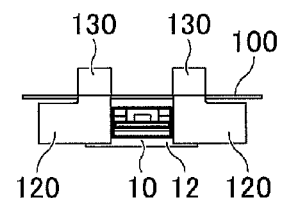
FIG.2C
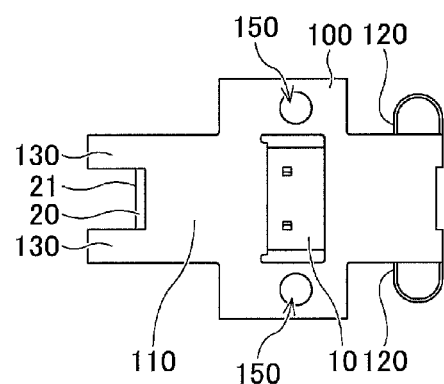

FIG.9A
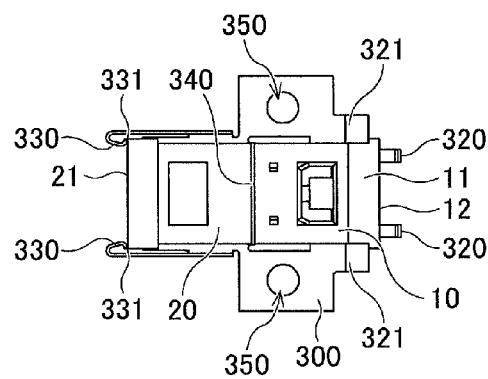
FIG.9D    FIG.9B    FIG.9E
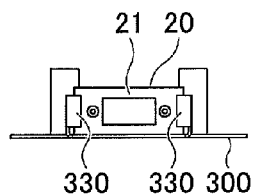 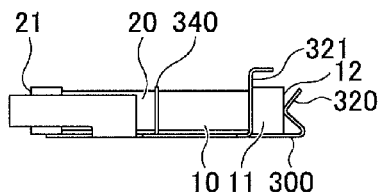 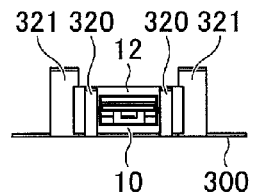
FIG.9C
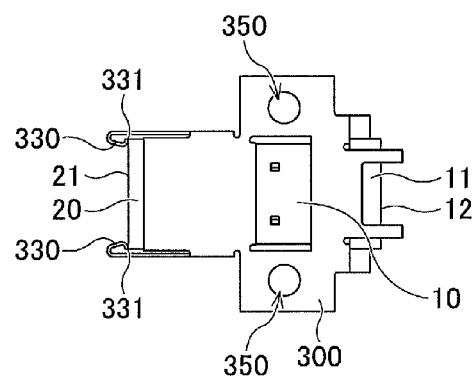

FIG.13A
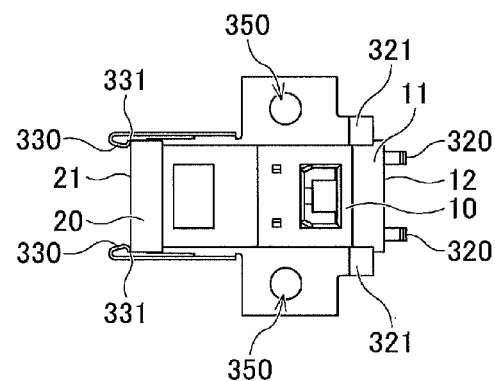
FIG.13D  FIG.13B  FIG.13E
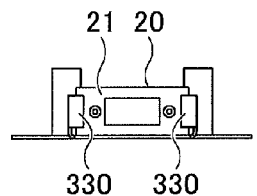 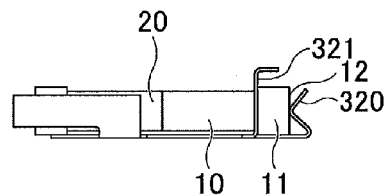 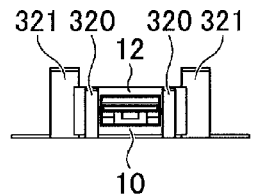
FIG.13C
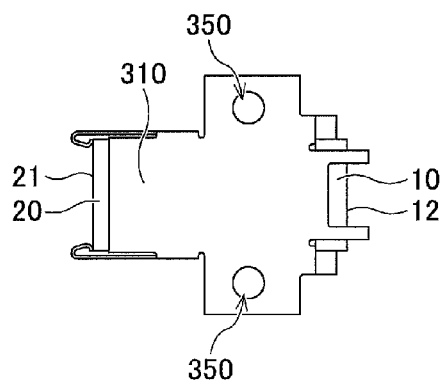

CONNECTING COMPONENT

CROSS-REFERENCE TO RELATED APPLICATION

The present application is based upon and claims the benefit of priority of Japanese Patent Application No. 2016-020623, filed on Feb. 5, 2016, the entire contents of which are incorporated herein by reference.

BACKGROUND OF THE INVENTION

1. Field of the Invention

The present invention relates to connecting components.

2. Description of the Related Art

For communications at high-speed interfaces of supercomputers and high-end servers, electrical wire cables such as copper cables have been used, while optical communications, which support high-speed signal transmission and make it possible to extend a transmission distance, are becoming popular.

For interfaces discussed in standards such as IBTA EDR (registered trademark) and 100G Ethernet (registered trademark), optical communications are employed because of a long transmission distance, and an optical module for converting an electrical signal into an optical signal is used. The optical module converts an optical signal input from an optical cable into an electrical signal to output the electrical signal, and converts an electrical signal into an optical signal to output the optical signal to the optical cable.

The optical module includes a light-emitting device that converts an electrical signal into an optical signal, a light-receiving device that converts an optical signal into an electrical signal, and a drive circuit that drives the light-emitting device which are mounted on a printed board. The light-emitting device and light-receiving device and a ferrule with lenses ("lens ferrule") are connected by an optical waveguide.

A mechanically transferable (MT) ferrule and the lens ferrule are fixed in alignment with each other by an optical connector clip ("clip") in the housing of the optical module.

Reference may be made to, for example, Japanese Laid-Open Patent Application Nos. 2015-23143, 2011-75814, 2005-326523, and 2010-224353 for related art.

SUMMARY OF THE INVENTION

According to an aspect of the present invention, a connecting component configured to fix a first ferrule and a second ferrule includes a first spring, a second spring, and a partition. The first spring and the second spring are provided at opposite ends of the connecting component. The partition is provided between the first spring and the second spring to be positioned between the first ferrule and the second ferrule. The first spring is configured to press the first ferrule toward the partition. The second spring is configured to press the second ferrule toward the partition.

According to an aspect of the present invention, a connecting component configured to fix a first ferrule and a second ferrule includes a case in which a recess for accommodating the first ferrule and the second ferrule is formed, and a support member placed over the recess and fixed to the case. A first support configured to support at least the first ferrule is formed in the recess. The support member includes a second support configured to support at least the second ferrule. The first ferrule and the second ferrule are fixed by the first support and the second support.

According to an aspect of the present invention, a connecting component configured to fix a first ferrule and a second ferrule includes a first spring and a second spring that are provided at opposite ends of the connecting component. The first ferrule and the second ferrule are held between the first spring and the second spring. The connecting component is configured to be fixed to the housing of the optical module.

BRIEF DESCRIPTION OF THE DRAWINGS

FIGS. 2A through 2E are diagrams depicting a lens ferrule and an MT ferrule fixed by the connecting component;

FIGS. 9A through 9E are diagrams depicting the lens ferrule and the MT ferrule fixed by the connecting component;

FIGS. 13A through 13E are diagrams depicting the lens ferrule and the MT ferrule fixed by the connecting component having the other configuration;

DESCRIPTION OF THE EMBODIMENTS

Figure 1:
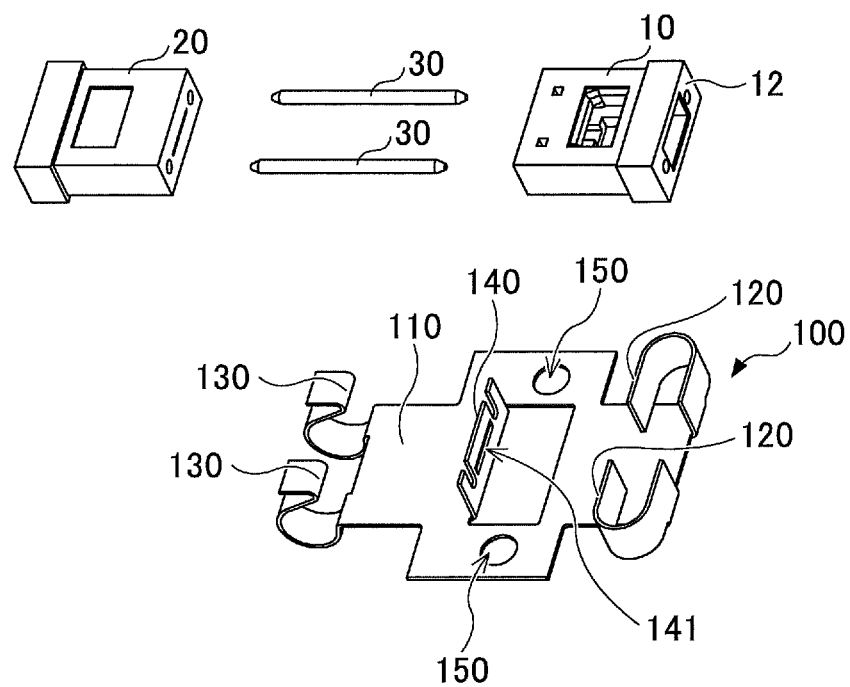
FIG. 1 is a perspective view of a connecting component according to a first embodiment.

The clip includes springs provided one at each end of the clip. One of the springs contacts an end of the lens ferrule and the other contacts an end of the MT ferrule, so that the lens ferrule and the MT ferrule are held and fixed by the springs. However, when the optical cable connected to the MT ferrule is pulled with the MT ferrule and the lens ferrule being fixed by the clip, the MT ferrule may move out of alignment with the lens ferrule to cause an optical loss between the ferrules.

Therefore, the spring force of the clip may be increased to prevent the MT ferrule from easily moving even when the optical cable is pulled. If the spring force of the clip is too strong, however, the lens ferrule may be cracked and broken because the lens ferrule formed of a transparent resin is not so strong as the MT ferrule.

Therefore, a connecting component that prevents an MT ferrule from moving relative to a lens ferrule without breaking the lens ferrule is desirable.

According to an aspect of the present invention, a connecting component can fix an MT ferrule to prevent the MT ferrule from moving relative to a lens ferrule without breaking the lens ferrule.

Embodiments of the present invention are described below. In the following description, the same element or member is referred to using the same reference numeral, and is not repetitively described.

[a] First Embodiment

Figure 3:
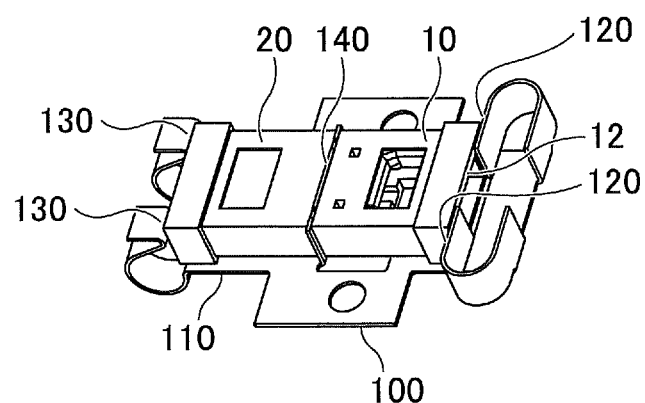
FIG. 3 is a perspective view of the lens ferrule and the MT ferrule fixed by the connecting component.

A connecting component for connecting ferrules according to a first embodiment is described with reference to FIGS. 1, 2A through 2E and 3. FIG. 1 is a perspective view of a connecting component, a lens ferrule, and an MT ferrule according to this embodiment. FIGS. 2A, 2B, 2C, 2D and 2E are a plan view, a front view, a bottom view, a left side view, and a right side view, respectively, of the lens ferrule and the MT ferrule fixed by the connecting component. FIG. 3 is a perspective view of the lens ferrule and the MT ferrule fixed by the connecting component.

A connecting component 100 according to this embodiment fixes a lens ferrule 10 and an MT ferrule 20 to each other. The lens ferrule 10 and the MT ferrule 20 are fixed in alignment with each other with two guide pins 30 being inserted into guide holes formed in the lens ferrule 10 and guide holes formed in the MT ferrule 20.

The connecting component 100 is formed by bending a single blanked metal plate. The connecting component 100 includes a body 110, first springs 120 provided at a first end of the body 110, second springs 130 provided at a second end of the body 110 opposite to the first end, and a partition 140 provided at the center of the body 110. Screw holes 150 for attaching the connecting component 100 to the housing of an optical module are formed in the body 110.

The first springs 120 are formed by bending end portions of the metal plate into a substantial U shape to exert an urging force toward the partition 140. The first springs 120 are formed one at each corner of the body 110 at its first end. The second springs 130 are formed by bending end portions of the metal plate to exert an urging force toward the partition 140. The second springs 130 are formed one at each corner of the body 110 at its second end.

The partition 140 is formed by making an angular U-shaped cut in a middle portion of the metal plate and raising a portion of the metal plate defined by the cut so that the raised portion stands substantially perpendicularly to a surface of the metal plate on the same side as the first springs 120 and the second springs 130 are formed. An opening 141 is formed in the center of the partition 140 to keep an optical path between the lens ferrule 10 and the MT ferrule 20.

The screw holes 150 are provided one on each side of the metal plate in its middle portion to be arranged in a direction parallel to a direction in which the two first springs 120 or the two second springs 130 are arranged.

The lens ferrule 10 is placed between the first springs 120 and the partition 140, and the MT ferrule 20 is placed between the second springs 130 and the partition 140. In this state, an end face 12 of the lens ferrule 10 to which an optical waveguide is to be connected is pressed toward the partition 140 by the first springs 120, and an end face 21 of the MT ferrule 20 to which an optical cable is to be connected is pressed toward the partition 140 by the second springs 130. The lens ferrule 10 and the MT ferrule 20 are thus fixed by the connecting component 100.

The first springs 120 have a spring force, which is weaker than the spring force of the second springs 130, to the extent that the lens ferrule 10 is not broken. The MT ferrule 20 is pressed toward the partition 140 by the second springs 130 with a spring force stronger than the spring force of the first springs 120. Accordingly, even when the optical cable connected to the MT ferrule 20 is pulled, the MT ferrule 20 is prevented from being displaced.

The partition 140 is positioned between the lens ferrule 10 and the MT ferrule 20 when the lens ferrule 10 and the MT ferrule 20 are fixed by the connecting component 100. Therefore, a gap commensurate with the thickness of the partition 140 is present at the connecting portion of the lens ferrule 10 and the MT ferrule 20. The gap between the lens ferrule 10 and the MT ferrule 20, however, causes no optical loss between the lens ferrule 10 and the MT ferrule 20 because the light gathered by the lenses of the lens ferrule 10 enters the MT ferrule 20.

Figure 4:
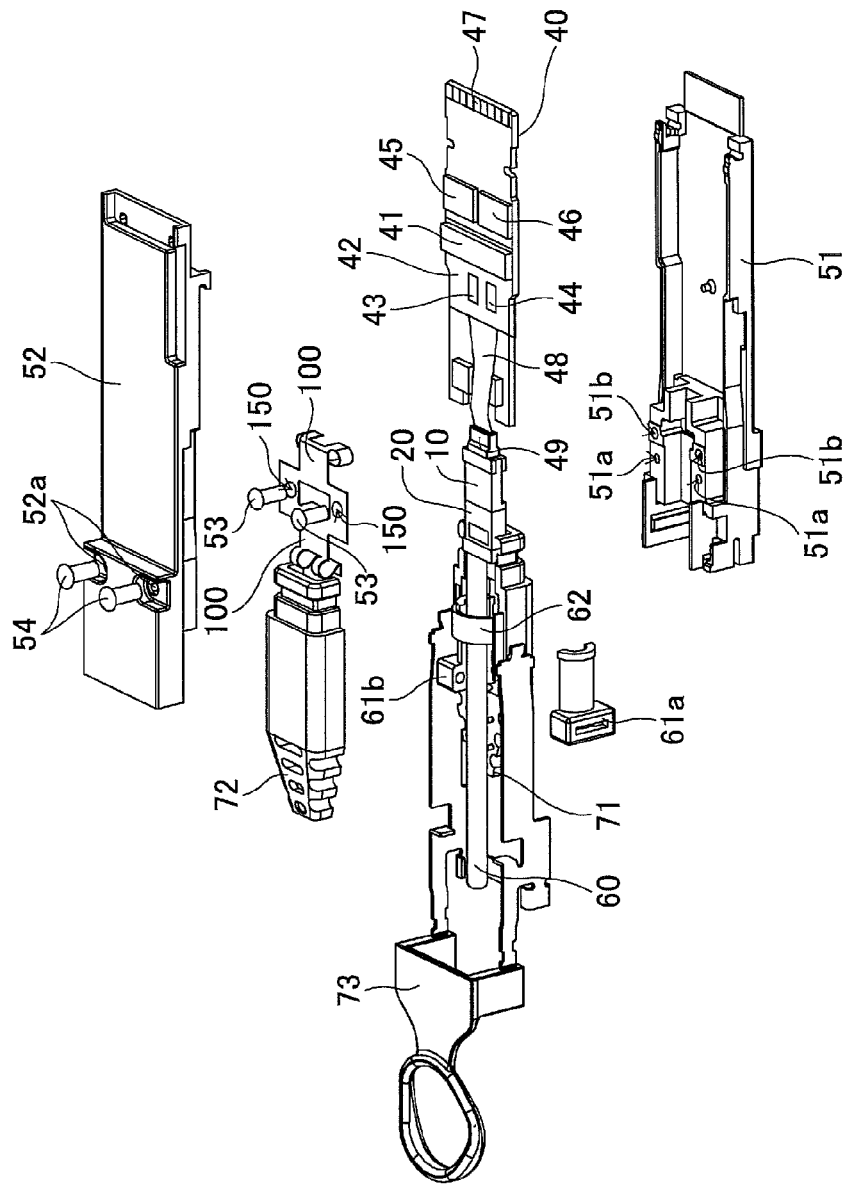
FIG. 4 is an exploded perspective view of an optical module according to the first embodiment.

Next, an optical module into which the lens ferrule 10 and the MT ferrule 20 fixed by the connecting component 100 are incorporated is described with reference to FIG. 4.

The optical module includes a housing that includes a lower case 51 and an upper case 52. Furthermore, the lens ferrule 10 and the MT ferrule 20 fixed by the connecting component 100, a printed board 40, and an optical waveguide 48 are accommodated in the housing. An optical cable 60 is connected to the optical module.

The printed board 40 is provided with a connector 41 to which a flexible printed circuit (FPC) 42 is connected. A light-emitting device 43 that converts an electrical signal into an optical signal, such as a vertical cavity surface emitting laser (VCSEL), and a light-receiving device 44 that converts an optical signal into an electrical signal, such as a photodiode, are mounted on the FPC 42. A driver IC 45 that drives the light-emitting device 43, a TIA 46 that converts an electric current output from the light-receiving device 44 into voltage, and a terminal 47 for connecting the optical module to an external device are provided on the printed board 40. The printed board 40 is placed in the lower case 51.

The optical waveguide 48 is a flexible sheet-shaped optical waveguide. A first end of the optical waveguide 48 is connected to the FPC 42, and a second end is connected to the lens ferrule 10. The connection of the optical waveguide 48 and the lens ferrule 10 is protected by a ferrule boot 49.

The lens ferrule 10 and the MT ferrule 20 are placed in the lower case 51 while being held by the connecting component 100. The connecting component 100 are fastened to the lower case 51 with screws 53 inserted through the screw holes 150 of the connecting component 100 and screw holes 51a formed in the lower case 51 that are aligned with each other. By thus screwing the connecting component 100 to the lower case 51, the lens ferrule 10 and the MT ferrule 20 are fixed to the lower case 51 with the connecting component 100.

Sleeves 61a and 61b are fixed to the optical cable 60 with a crimp ring 62. Cable boots 71 and 72 are placed over the optical cable 60 to which the sleeves 61a and 61b are fixed from above and below the optical cable 60, and a pull tab and latch 73 is attached to the lower case 51.

With the lens ferrule 10 and the MT ferrule 20 being fixed to the lower case 51 with the connecting component 100 and the printed board 40 being placed on the lower case 51, the upper case 52 is placed on and fastened to the lower case 51 with screws 54 inserted through screw holes 52*a* of the upper case 52 and screw holes 51*b* of the lower case 51 that are aligned with each other.

[b] Second Embodiment

Figure 5:
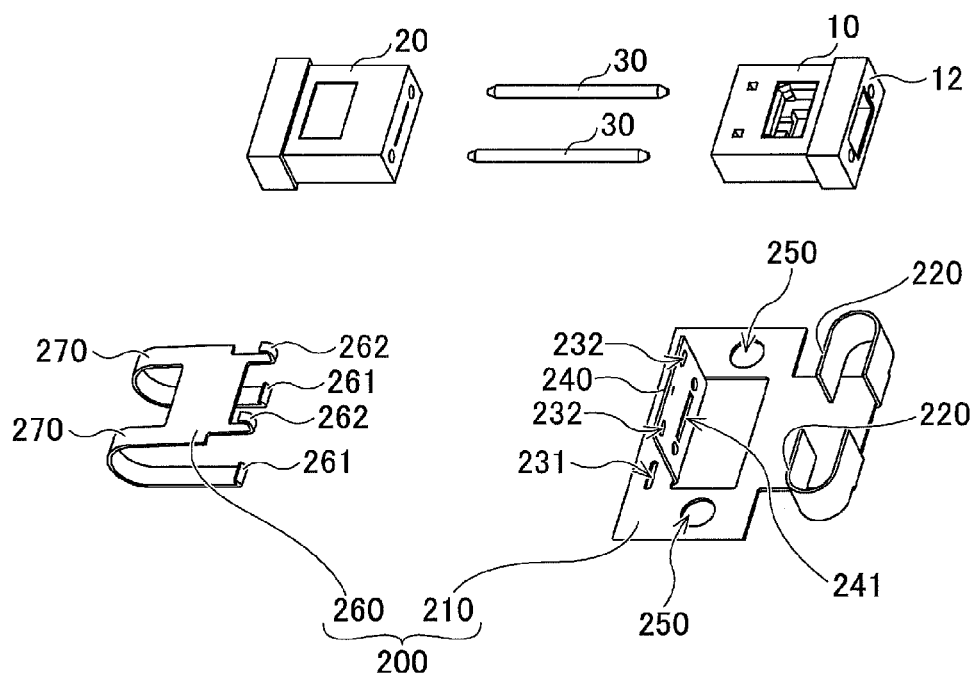
FIG. 5 is a perspective view of a connecting component according to a second embodiment.
Figure 6A:
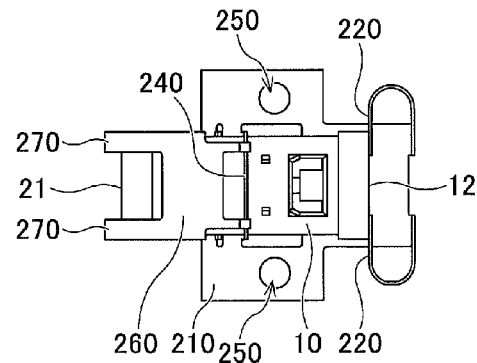
FIGS. 6A through 6E are diagrams depicting the lens ferrule and the MT ferrule fixed by the connecting component.
Figure 6D:
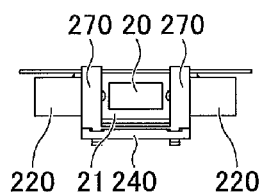
Figure 6B:
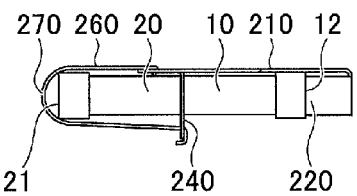
Figure 6E:
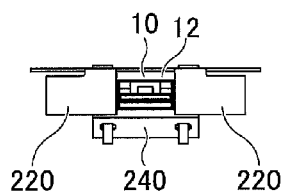
Figure 6C:
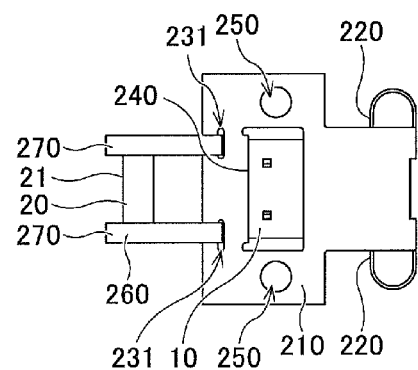
Figure 7:
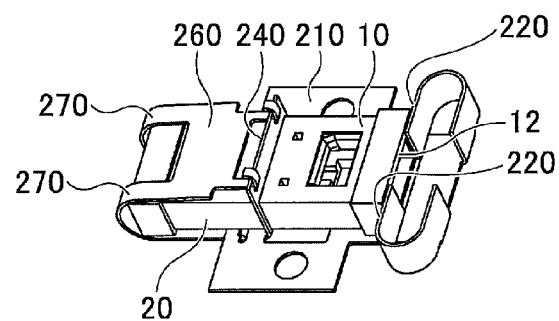
FIG. 7 is a perspective view of the lens ferrule and the MT ferrule fixed by the connecting component.

Next, a connecting component according to a second embodiment is described with reference to FIGS. 5, 6A through 6E and 7. FIG. 5 is a perspective view of a connecting component, a lens ferrule, and an MT ferrule according to this embodiment. FIGS. 6A, 6B, 6C, 6D and 6E are a plan view, a front view, a bottom view, a left side view, and a right side view, respectively, of the lens ferrule and the MT ferrule fixed by the connecting component. FIG. 7 is a perspective view of the lens ferrule and the MT ferrule fixed by the connecting component.

A connecting component 200 according to this embodiment fixes the lens ferrule 10 and the MT ferrule 20 to each other. The lens ferrule 10 and the MT ferrule 20 are fixed by the connecting component 200 in alignment with each other with the guide pins 30 being inserted into guide holes formed in the lens ferrule 10 and in the MT ferrule 20.

The connecting component 200 includes a first connecting member 210 and a second connecting member 260. The first connecting member 210 includes first springs 220 provided at a first end of the first connecting member 210, a partition 240 provided near a second end of the first connecting member 210 opposite to the first end, and screw holes 250 for attaching the connecting component 200 to the housing of an optical module. Furthermore, first connection holes 231 are formed near the second end and second connection holes 232 are formed in the partition 240 for connection to the second connecting member 260.

The second connecting member 260 is bent to form second springs 270 at a first end. First hooks 261 corresponding to the first connection holes 231 and second hooks 262 corresponding to the second connection holes 232 are provided at a first portion (lower portion in FIG. 5) and a second portion (upper portion in FIG. 5), respectively, of the second connecting member 260.

According to this embodiment, the second springs 270 have a stronger spring force than the first springs 220. Accordingly, the second connecting member 260 is thicker than the first connecting member 210. The first connecting member 210 and the second connecting member 260 may be formed of different materials as long as the second springs 270 have a stronger spring force than the first springs 220. For example, the first connecting member 210 may be formed of a resin material, and the second connecting member 260 may be formed of a metal material. This is because metal materials are generally higher in stiffness than resin materials to often provide higher spring characteristics.

The first springs 220 are formed by bending end portions of a metal plate into a substantial U shape to exert an urging force toward the partition 240. The first springs 220 are formed one at each corner of the metal plate at its first end. The partition 240 is formed by making an angular U-shaped cut in a portion of the metal plate at its second end and raising a portion of the metal plate defined by the cut so that the raised portion stands substantially perpendicularly to a surface of the metal plate on the same side of the metal plate as the first springs 220. An opening 241 is formed in the center of the partition 240 to keep an optical path between the lens ferrule 10 and the MT ferrule 20. The screw holes 250 are provided one on each side of the metal plate. The second springs 270 are formed by bending a metal plate so that the metal plate has a U shape in a side view.

The lens ferrule 10 is inserted between the partition 240 and the first springs 220 to be placed in the connecting component 200 with the end face 12 of the lens ferrule 10 being pressed toward the partition 240 by the first springs 220.

The MT ferrule 20 is placed inside the U-shaped second connecting member 260 to be placed in the connecting component 200 with the first hooks 261 engaging with the first connection holes 231 and the second hooks 262 engaging with the second connection holes 232. As a result, the MT ferrule 20 is held and fixed between the partition 240 and the second springs 270. The MT ferrule 20 is fixed with its end face 21 being pressed hard toward the partition 240 by the second springs 270. Accordingly, even when the optical cable connected to the MT ferrule 20 is pulled, the MT ferrule 20 is prevented from being displaced.

The partition 240 is positioned between the lens ferrule 10 and the MT ferrule 20 when the lens ferrule 10 and the MT ferrule 20 are fixed by the connecting component 200. Therefore, a gap commensurate with the thickness of the partition 240 is present at the connection of the lens ferrule 10 and the MT ferrule 20. The gap between the lens ferrule 10 and the MT ferrule 20, however, causes no optical loss between the lens ferrule 10 and the MT ferrule 20 because the light gathered by the lenses of the lens ferrule 10 enters the MT ferrule 20.

In other respects than those described above, the second embodiment may be the same as the first embodiment.

[c] Third Embodiment

Figure 8:
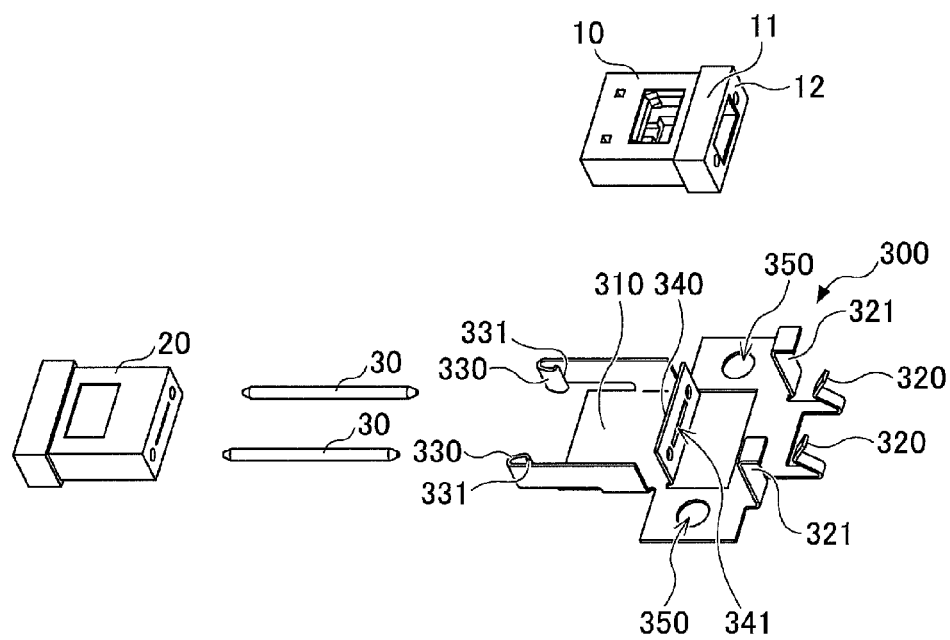
FIG. 8 is a perspective view of a connecting component according to a third embodiment.
Figure 10:
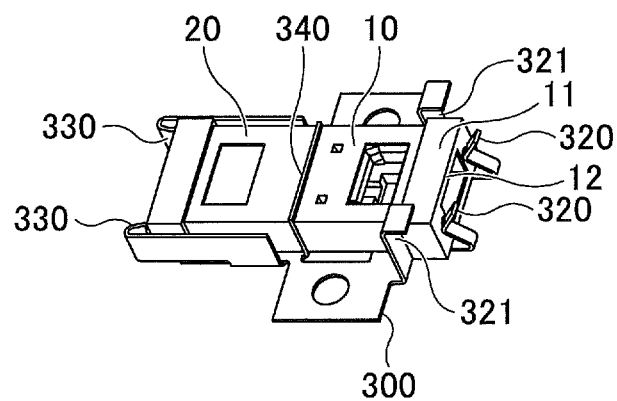
FIG. 10 is a perspective view of the lens ferrule and the MT ferrule fixed by the connecting component according.

Next, a connecting component according to a third embodiment is described with reference to FIGS. 8, 9A through 9E and 10. FIG. 8 is a perspective view of a connecting component, a lens ferrule, and an MT ferrule according to this embodiment. FIGS. 9A, 9B, 9C, 9D and 9E are a plan view, a front view, a bottom view, a left side view, and a right side view, respectively, of the lens ferrule and the MT ferrule fixed by the connecting component. FIG. 10 is a perspective view of the lens ferrule and the MT ferrule fixed by the connecting component.

A connecting component 300 according to this embodiment fixes the lens ferrule 10 and the MT ferrule 20 to each other. The connecting component 300 is formed by processing a metal plate. The connecting component 300 includes a body 310, first springs 320, second springs 330, and a partition 340 provided at the center of the body 310. Screw holes 350 for attaching the connecting component 300 to the housing of an optical module are formed in the body 310.

The first springs 320 are formed by bending end portions of the metal plate to exert an urging force toward the partition 340. The first springs 320 are formed one at each corner of the body 310 at its first end. The second springs 330 are formed by bending end portions of the metal plate inward to exert an urging force toward the partition 340. The second springs 330 are formed one at each corner of the body 110 at its second end. An engaging part 331 for fixing the MT ferrule 20 by a snap-fit is formed at an end of each second spring 330. The partition 340 is formed by making an angular U-shaped cut in a middle portion of the metal plate and raising a portion of the metal plate defined by the cut so that the raised portion stands substantially perpendicularly to a surface of the metal plate. An opening 341 is formed in the center of the partition 340 to keep an optical path between the lens ferrule 10 and the MT ferrule 20. The screw holes 350 are provided one on each side of the metal plate in its middle portion.

The lens ferrule 10 is placed between the first springs 320 and the partition 340, and the MT ferrule 20 is placed between the engaging parts 331 and the partition 340. In this state, the end face 12 of the lens ferrule 10 is pressed toward the partition 340 by the first springs 320, and the MT ferrule 20 is held between the engaging parts 331 and the partition 340 with the end face 21 of the MT ferrule 20 contacting the engaging parts 331. In this state, the lens ferrule 10 and the MT ferrule 20 are fixed by the connecting component 300.

Next, the connection of the lens ferrule 10 and the MT ferrule 20 to the connecting component 300 is described with reference to FIGS. 11A through 11D.

Figure 11A:
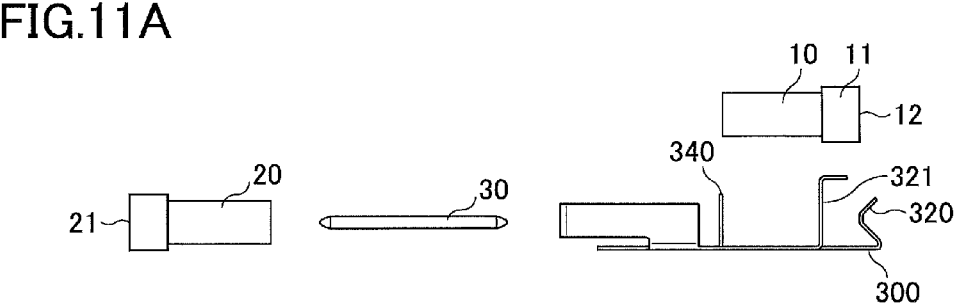
FIGS. 11A through 11D are diagrams depicting a method of connecting the lens ferrule and the MT ferrule to the connecting component.
Figure 11B:
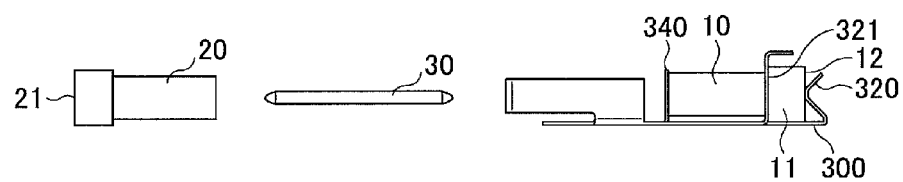

FIG. 11A depicts the connecting component 300, the lens ferrule 10, the MT ferrule 20, and the guide pins 30 that are separated from each other.

As depicted in FIG. 113, the lens ferrule 10 is inserted between the first springs 320 and the partition 340 from above the connecting component 300. The connecting component 300 includes ferrule supports 321 between the first springs 320 and the partition 340. A fixing part 11 of the lens ferrule 10 to which the optical waveguide connects is wider than the other part of the lens ferrule 10. According to this embodiment, by inserting the fixing part 11 between the first springs 320 and the ferrule supports 321, the end face 12 of the lens ferrule 10 on the optical waveguide connecting side is pressed toward the ferrule supports 321 by the first springs 320, so that the lens ferrule 10 is placed in the connecting component 300 with the fixing part 11 held between the first springs 320 and the ferrule supports 321.

Figure 11C:
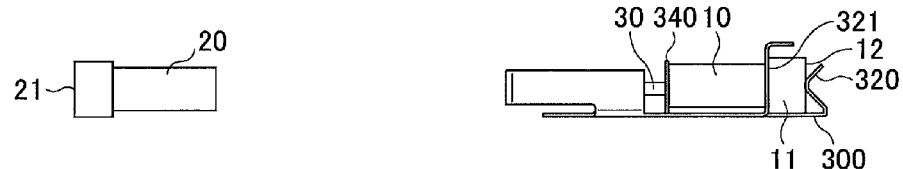

Next, as depicted in FIG. 11C, the two guide pins 30 are inserted into the lens ferrule 10.

Figure 11D:
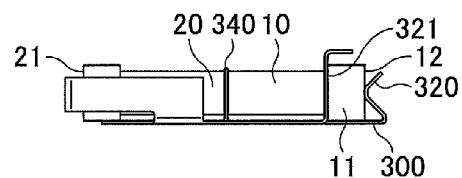

Next, as depicted in FIG. 11D, by inserting the two guide pins 30 into the MT ferrule 20, the MT ferrule 20 is placed in the connecting component 300. The MT ferrule 20 is moved along the guide pins 30 to go beyond the engaging parts 331 of the connecting component 300 in which the lens ferrule 10 is placed, so that the end face 21 of the MT ferrule 20 is held by the engaging parts 331. When the MT ferrule 20 is moved into the connecting component 300, the second springs 330 flex. When the MT ferrule 20 goes beyond the engaging parts 331, the engaging parts 331 return inward because of the spring force of the second springs 330. As a result, the end face 21 of the MT ferrule 20 contacts the engaging parts 331 to be held by the engaging parts 331. The direction in which the MT ferrule 20 is moved is the direction to connect to the lens ferrule 10. It is possible to place the MT ferrule 20 in the connecting component 300 by moving the MT ferrule 20 into the connecting component 300 along this direction. Therefore, even when an optical cable is connected to the MT ferrule 20, it is possible to easily place the MT ferrule 20 in the connecting component 300.

Furthermore, when the MT ferrule 20 is placed in the connecting component 300, the end face 21 of the MT ferrule 20 is held by the engaging parts 331. Accordingly, even when the optical cable connected to the MT ferrule 20 is pulled, the MT ferrule 20 is prevented from being displaced.

Figure 12:
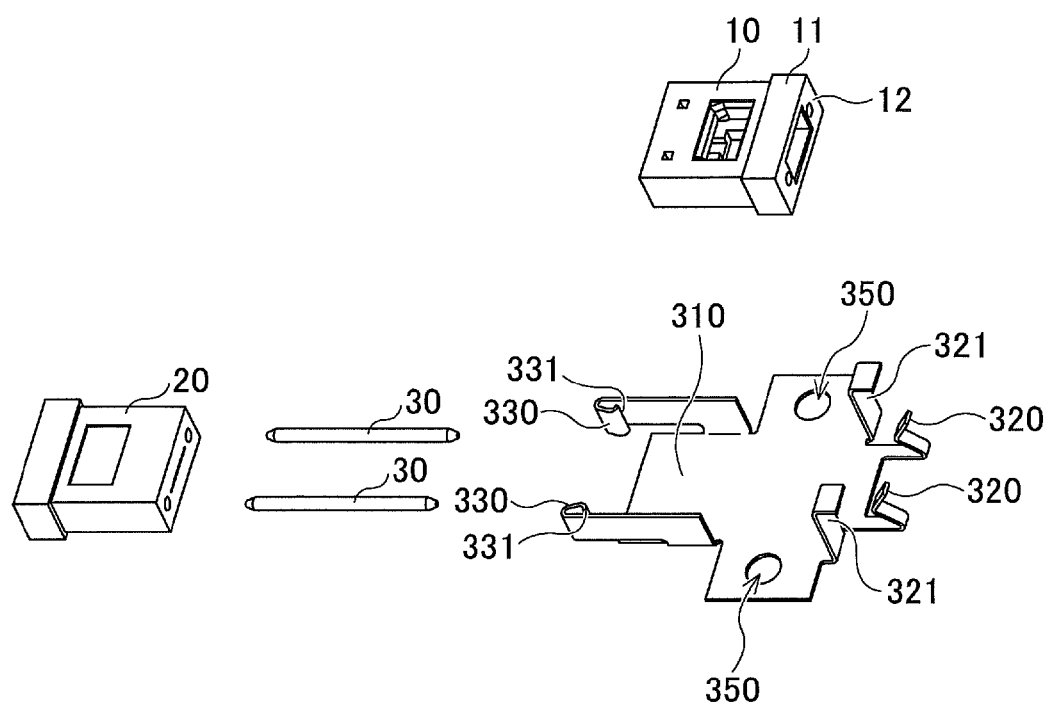
FIG. 12 is a perspective view of the connecting component having another configuration according to the third embodiment.
Figure 14:
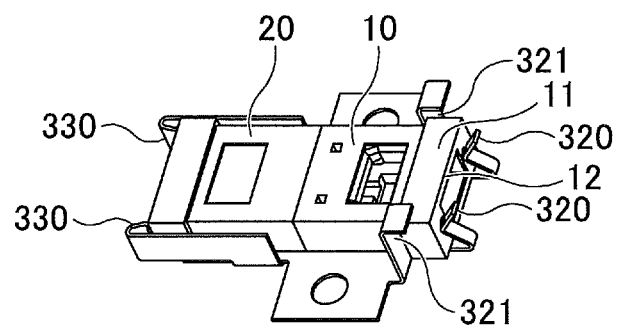
FIG. 14 is a perspective view of the lens ferrule and the MT ferrule fixed by the connecting component having the other configuration.

The above description is given of the connecting component 300 including the partition 340. Alternatively, the connecting component 300 may be without the partition 340 as depicted in FIGS. 12, 13A through 13E and 14. In this case, the lens ferrule 10 is placed in the connecting component 300 with the fixing part 11 being held between the ferrule supports 321 and the first springs 320, and the MT ferrule 20 is placed in the connecting component 300, being held between the lens ferrule 10 and the engaging parts 331. FIG. 12 is a perspective view of the connecting component, the lens ferrule, and the MT ferrule. FIGS. 13A, 13B, 13C, 13D and 13E are a plan view, a front view, a bottom view, a left side view, and a right side view, respectively, of the lens ferrule and the MT ferrule fixed by the connecting component. FIG. 14 is a perspective view of the lens ferrule and the MT ferrule fixed by the connecting component.

[d] Fourth Embodiment

Figure 15:
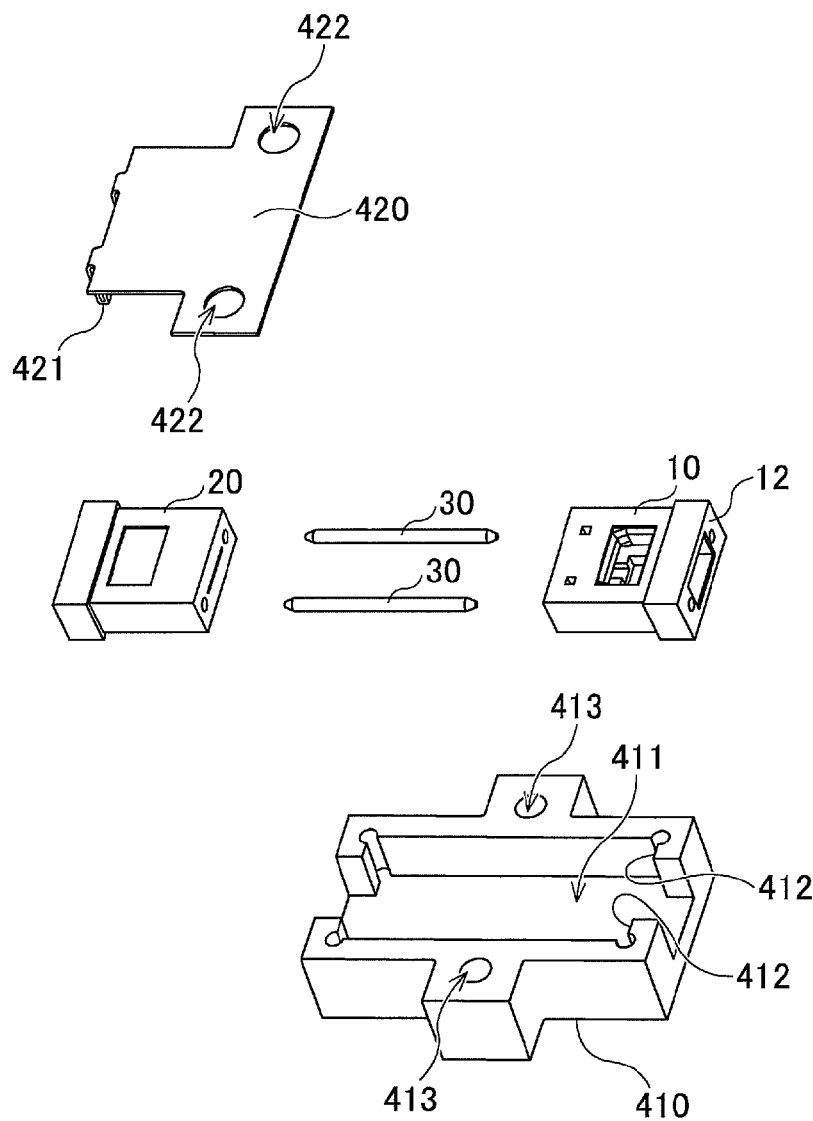
FIG. 15 is a perspective view of a connecting component according to a fourth embodiment.
Figure 16A:
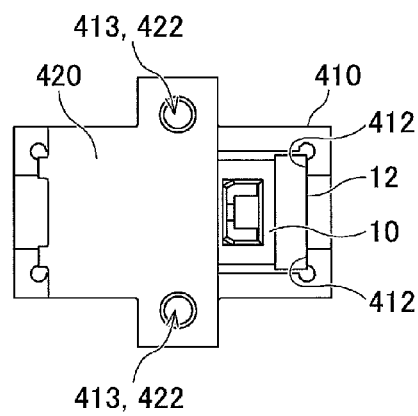
FIGS. 16A through 16E are diagrams depicting the lens ferrule and the MT ferrule fixed by the connecting component.
Figure 16D:
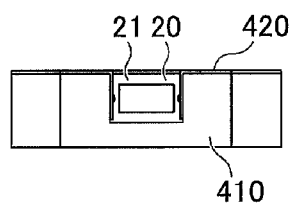
Figure 16B:
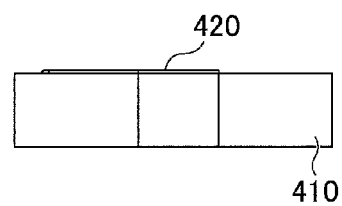
Figure 16E:
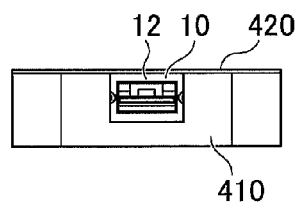
Figure 16C:
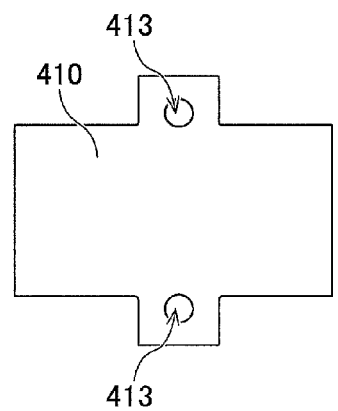
Figure 17:
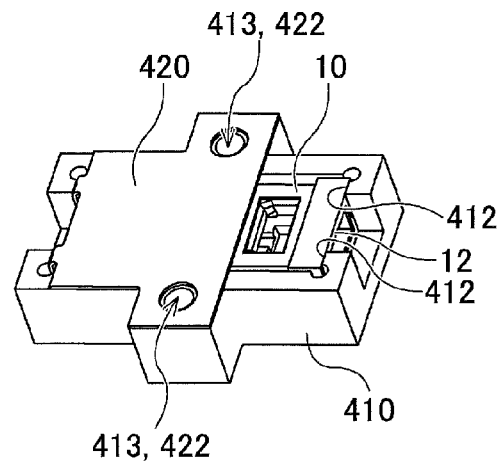
FIG. 17 is a perspective view of the lens ferrule and the MT ferrule fixed by the connecting component.

Next, a connecting component according to a fourth embodiment is described with reference to FIGS. 15, 16A through 16E and 17. FIG. 15 is a perspective view of a connecting component, a lens ferrule, and an MT ferrule according to this embodiment. FIGS. 16A, 16B, 16C, 16D and 16E are a plan view, a front view, a bottom view, a left side view, and a right side view, respectively, of the lens ferrule and the MT ferrule fixed by the connecting component. FIG. 17 is a perspective view of the lens ferrule and the MT ferrule fixed by the connecting component.

A connecting component 400 according to this embodiment fixes the lens ferrule 10 and the MT ferrule 20 to each other. The lens ferrule 10 and the MT ferrule 20 are fixed in alignment with each other with the two guide pins 30 being inserted into guide holes formed in the lens ferrule 10 and guide holes formed in the MT ferrule 20.

The connecting component 400 includes a case 410 and a support member 420 that supports the MT ferrule 20. A recess 411 for accommodating the lens ferrule 10 and the MT ferrule 20 is formed in the case 410. First supports 412 that contact the lens ferrule 10 are provided at a first end of the recess 411. Screw holes 413 for fixing the support member 420 are provided one on each side of the case 410 to be arranged in a direction perpendicular to a direction in which the lens ferrule 10 and the MT ferrule 20 are arranged. Second supports 421 that have a spring force and support the MT ferrule 20 are provided on and screw holes 422 are provided in the support member 420.

According to this embodiment, the case 410 is formed of a resin material that can be easily processed into a desired shape, and the support member 420 is formed of a metal material.

The lens ferrule 10 and the MT ferrule 20 are placed in the recess 411 of the case 410, and the support member 420 is placed over the case 410 to be screwed to the case 410, thereby fixing the lens ferrule 10 and the MT ferrule 20 that are connected to each other.

In this state, the end face 12 of the lens ferrule 10 to which the optical waveguide is connected contacts the first supports 412. Furthermore, the end face 21 of the MT ferrule 20 to which the optical cable is connected is pressed toward the lens ferrule 10 by the second supports 421.

Because the lens ferrule 10 and the MT ferrule 20 are placed and fixed to each other in the recess 411, the side surfaces of the lens ferrule 10 and the MT ferrule 20 are in contact with the sidewalls of the recess 411. Therefore, the movements of the lens ferrule 10 and the MT ferrule 20 in four directions are restricted.

According to this embodiment, the lens ferrule 10 and the MT ferrule 20 are placed, being held between the first supports 412 and the second supports 421. Furthermore, because the lens ferrule 10 and the MT ferrule 20 are placed in the recess 411, the MT ferrule 20 does not move out of alignment with the lens ferrule 10. Accordingly, even when the optical cable connected to the MT ferrule 20 is pulled, the MT ferrule 20 is prevented from being displaced.

[e] Fifth Embodiment

Figure 18:
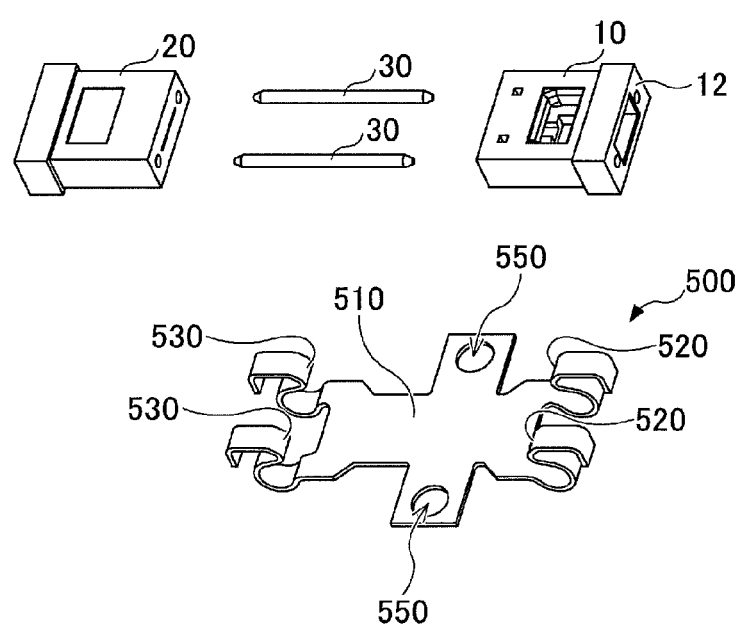
FIG. 18 is a perspective view of a connecting component according to a fifth embodiment.

Next, a connecting component according to a fifth embodiment is described with reference to FIG. 18.

A connecting component 500 according to this embodiment fixes the lens ferrule 10 and the MT ferrule 20 to each other. The connecting component 500 is formed by processing a metal plate, and includes a body 510, first springs 520, and second springs 530. Screw holes 550 for attaching the connecting component 500 to the housing of an optical module are formed in the body 510.

The first springs 520 are formed by bending the metal plate, one at each corner of the body 510 at its first end. The second springs 530 are formed by bending the metal plate, one at each corner of the body 510 at its second end. The screw holes 550 are provided one on each side of the metal plate in its middle portion.

According to this embodiment, the lens ferrule 10 and the MT ferrule 20 are held between the first springs 520 and the second springs 530 to be fixed. The connecting component 500 fixing the lens ferrule 10 and the MT ferrule 20 is screwed to an optical module using the screw holes 550.

All examples and conditional language provided herein are intended for pedagogical purposes of aiding the reader in understanding the invention and the concepts contributed by the inventors to further the art, and are not to be construed as limitations to such specifically recited examples and conditions, nor does the organization of such examples in the specification relate to a showing of the superiority or inferiority of the invention. Although one or more embodiments of the present invention have been described in detail, it should be understood that the various changes, substitutions, and alterations could be made hereto without departing from the spirit and scope of the invention.

What is claimed is:

1. A connecting component configured to fix a first ferrule and a second ferrule, the connecting component comprising:
   a first spring and a second spring provided at opposite ends of the connecting component; and
   a partition provided between the first spring and the second spring to be positioned between and contacted by an end of the first ferrule and an end of the second ferrule, the end of the first ferrule and the end of the second ferrule facing toward each other,
   wherein the first spring is configured to press the first ferrule toward the partition, and
   the second spring is configured to press the second ferrule toward the partition.

2. The connecting component as claimed in claim 1, further comprising:
   a first connecting member on which the first spring is formed; and
   a second connecting member on which the second spring is formed,
   wherein the partition is formed on either one of the first connecting member and the second connecting member, and
   wherein the first connecting member and the second connecting member are configured to connect to each other to fix the first ferrule and the second ferrule.

3. The connecting component as claimed in claim 1, further comprising:
   a screw hole for attaching the connecting component to a housing of an optical module.

4. The connecting component as claimed in claim 1, further comprising:
   a support configured to support the first ferrule,
   wherein the first ferrule is fixed between the first spring and the support and the second ferrule is fixed between the first ferrule and the second spring.

5. The connecting component as claimed in claim 4, wherein the support is provided between the first spring and the second spring.

6. A connecting component configured to fix a first ferrule and a second ferrule, the connecting component comprising:
   a case in which a recess for accommodating the first ferrule and the second ferrule is formed, wherein a first support configured to support at least the first ferrule is formed in the recess; and
   a support member placed over the recess and fixed to the case, the support member including a second support, the second support having resilience, and configured to support at least the second ferrule and urge the second ferrule toward the first ferrule,
   wherein the first ferrule and the second ferrule are fixed by the first support and the second support.

7. The connecting component as claimed in claim 6, further comprising:
   a screw hole for attaching the connecting component to a housing of an optical module.

8. A connecting component configured to fix a first ferrule and a second ferrule, the connecting component comprising:
   a first spring and a second spring provided at opposite ends of the connecting component, and configured to hold the first ferrule and the second ferrule therebetween,
   wherein a plurality of screw holes for fixing the connecting component to a housing of an optical module are formed in the connecting component, the plurality of screw holes being aligned in a direction perpendicular to a direction in which the first spring and the second spring are aligned.

9. The connecting component as claimed in claim 8, further comprising:
   a support configured to support the first ferrule,
   wherein the first ferrule is fixed between the first spring and the support and the second ferrule is fixed between the first ferrule and the second spring.

10. The connecting component as claimed in claim 9, wherein the support is provided between the first spring and the second spring.

* * * * *